US 8,901,870 B2

(12) United States Patent
Yamada et al.

(10) Patent No.: US 8,901,870 B2
(45) Date of Patent: Dec. 2, 2014

(54) SYNCHRONOUS CONTROL APPARATUS

(75) Inventors: Takaaki Yamada, Kusatsu (JP); Hiroshi Sawaragi, Kusatsu (JP); Junji Shimamura, Takatsuki (JP)

(73) Assignee: Omron Corporation, Kyoto (JP)

( * ) Notice: Subject to any disclaimer, the term of this patent is extended or adjusted under 35 U.S.C. 154(b) by 321 days.

(21) Appl. No.: 13/547,608

(22) Filed: Jul. 12, 2012

(65) Prior Publication Data
US 2013/0033218 A1 Feb. 7, 2013

(30) Foreign Application Priority Data
Aug. 3, 2011 (JP) .................................. 2011-170169

(51) Int. Cl.
G05B 19/10 (2006.01)
G05B 19/06 (2006.01)

(52) U.S. Cl.
CPC ...... *G05B 19/06* (2013.01); *G05B 2219/50234* (2013.01); *G05B 2219/50233* (2013.01)
USPC ........... 318/567; 318/561; 318/569; 318/560; 318/700; 700/73; 700/63; 700/32; 700/34

(58) Field of Classification Search
CPC ................. G05B 19/4103; G05B 2219/42186; G05B 2219/43174; G05B 19/06; G05B 2219/34208; G05B 2219/40264; G05B 2219/40307; G05B 2219/41208; G05B 2219/42074; G05B 2219/42191; G05B 2219/43097; G05B 2219/43196; G05B 2219/45083; G05B 7/02; G05B 19/416; G05B 19/404; G05B 19/425; G05B 19/42; G05B 19/4205; G05B 19/19; G05B 5/01; G05B 11/42; F02D 41/009; F02D 41/26; F02D 13/0238; B60K 1/02; Y10S 903/906; Y10S 903/916; B23P 2700/02; H02P 23/0045; H02P 6/142; H02P 6/06; H02P 6/08; H02P 6/085; H02P 6/145; G05D 1/0242; A47L 9/009; A47L 2201/00; B60N 2/0248; B25J 9/126; B25J 9/1689; B25J 9/1633; B25J 9/042; B25J 9/08; G06F 3/016; G11B 19/28
USPC ......... 318/560, 561, 567, 569, 576, 572, 578, 318/671, 520, 553, 554, 555, 690, 700; 700/32, 34, 46, 63, 73
See application file for complete search history.

(56) References Cited

U.S. PATENT DOCUMENTS 5,528,506 A * 6/1996 Yoshida et al. ............... 700/188
6,246,201 B1 * 6/2001 Aderek et al. ................ 318/632
(Continued)

FOREIGN PATENT DOCUMENTS

JP    59-183413    10/1984
JP    5-127731    5/1993
(Continued)

*Primary Examiner* — Kawing Chan
*Assistant Examiner* — Jorge L Carrasquillo
(74) *Attorney, Agent, or Firm* — Greenblum & Bernstein, P.L.C.

(57) ABSTRACT

A synchronous control apparatus capable of switching cam curves with ease and without delay is provided. A cam curve storing unit stores a representation of a first cam curve and a representation of a second cam curve. Before switch-over of the cam curves, a control unit finds a position command value to a driven-side member, after the switch-over of the cam curves, the control unit finds the position command value, and in a switch-over period of the cam curves, the control unit finds the position command value to the driven-side member based on a value obtained by utilizing first data based on the first cam curve or a position of the driven shaft and second data based on the second cam curve to provide a weighted average at each control timing.

12 Claims, 8 Drawing Sheets

(56) References Cited

U.S. PATENT DOCUMENTS 7,603,188 B2 * 10/2009 Maeda .............................. 700/63
2004/0049302 A1 * 3/2004 Nagamatsu et al. ............. 700/73
2006/0271208 A1 * 11/2006 Weinhofer et al. .............. 700/17

FOREIGN PATENT DOCUMENTS

| JP | 05189018 A | * | 7/1993 |
| JP | 06301423 A | * | 10/1994 |

* cited by examiner

SYNCHRONOUS CONTROL APPARATUS

This application claims benefit of priority under 35 U.S.C. §119 to Japanese Patent Application No. 2011-170169 filed on Aug. 3, 2011, which is expressly incorporated herein by reference in its entirety.

BACKGROUND OF THE INVENTION

1. Technical Field

The present invention relates to a synchronous control apparatus, and particularly to a synchronous control apparatus that synchronously operates a main shaft and a driven shaft with an arbitrary gear ratio.

2. Related Art

A programmable logic controller (hereinafter, referred to as a "PLC") is made up of a plurality of units including, for example, an arithmetic operation unit that executes a user program, an IO (Input Output) unit responsible for signal input from an external switch or an external sensor, and signal output to an external relay or an external actuator, and the like. The PLC executes control operation while giving and receiving data via a PLC system bus and/or a field network in every user program execution cycle among the above-described units.

As control of operation of machinery, equipment and the like, motion control to control a motion of a motor may be included. As a representative example of the above-described motion control, an application that performs positioning of a mechanical mechanism such as a positioning table or robot is assumed.

In a motion controller, synchronous operation and synchronous control means systems in which a main shaft and a driven shaft are operated while maintaining some relationships, and generally include cam operation and gear operation. The cam operation is a system of searching a position (displacement) of the driven shaft corresponding to a position (phase) of the main shaft from a cam table in each control period to decide a command position of the driven shaft. The gear operation is a system of determining the command position of the driven shaft with a value obtained by multiplying a velocity of the main shaft by the gear ratio used as a command velocity of the driven shaft.

In a position control system performing the synchronous control, when a cam curve is switched, a position target value (position command value) becomes discontinuous, causing vibration and impact.

Against this problem, for example, in Japanese Unexamined Patent Publication Nos. S59-183413 and H5-127731, there is disclosed a technique of generating an orbit (a curve of a command value) so that a position and a velocity are not discontinuous at an end of a connection section of the cam curve.

However, in Japanese Unexamined Patent Publication Nos. S59-183413 and H5-127731, a velocity curve needs to be generated in advance, and thus, a user cannot switch the cam curve at arbitrary timing.

Moreover, in Japanese Unexamined Patent Publication Nos. S59-183413 and H5-127731, since a higher-order curve in which a derivative value is continuous needs to be generated, complicated software processing is required. Thus, there is a problem that real-time calculation within a control period is disabled in a CPU of a low specification.

SUMMARY

The present invention has been devised to solve the problems described above, and an object thereof is to provide a synchronous control apparatus capable of switching cam curves with ease and without delay.

In order to solve the above-described problem, in accordance with one aspect of the present invention, there is provided a synchronous control apparatus that executes synchronous control of a main shaft and a driven shaft in each control period, including a storage that stores a representation of a first cam curve and a representation of a second cam curve, and a controller that calculates a position command value of the driven shaft to control the driven shaft with the calculated position command value. Before switch-over of the cam curves, the controller finds the position command value to a driven-side member, based on a value on the first cam curve at each control timing. After the switch-over of the cam curves, the controller finds the position command value, based on a value on the second cam curve at each control timing. In a switch-over period of the cam curves, the controller finds the position command value to the driven-side member, based on a value obtained by subjecting (or utilizing) first data based on any one of the first cam curve and a position of the driven shaft and second data based on the second cam curve to provide a weighted average at each control timing.

Preferably, in the weighted average, a weight is variable in conjunction with a main shaft position, and at start timing of the switch-over period, a weight of the first data is set larger than a weight of the second data, and at end timing of the switch-over period, the weight of the first data is set smaller than the weight of the second data.

Preferably, the first data is the value on the first cam curve at each control timing.

Preferably, the first data is the value on the first cam curve at start timing of the switch-over period.

Preferably, the first data is the position of the driven shaft at each control timing.

Preferably, the first data is the position of the driven shaft at start timing of the switch-over period.

Preferably, the second data is the value on the second cam curve at each control timing.

Preferably, the second data is the value on the second cam curve at end timing of the switch-over period.

Preferably, when in the weighted average, a weight of the first data is (1−a), and a weight of the second data is "a", the weight "a" is 0 at start timing of the switch-over period, and monotonically increases as clock time (i.e., a time period) advances in the switch-over period to reach 1 at end timing of the switch-over period.

Preferably, the weight "a" changes as a linear function with respect to clock time.

Preferably, the weight "a" changes as an n-th order function with respect to clock time, where "n" is a positive real number other than 1.

Preferably, the weight "a" changes as a sine function with respect to clock time.

Preferably, the weight "a" changes as a cosine function with respect to clock time.

According to the present invention, the impact applied to the driven shaft can be alleviated, and the synchronous control can be surely started at the synchronization start position.

DETAILED DESCRIPTION

Figure 1:
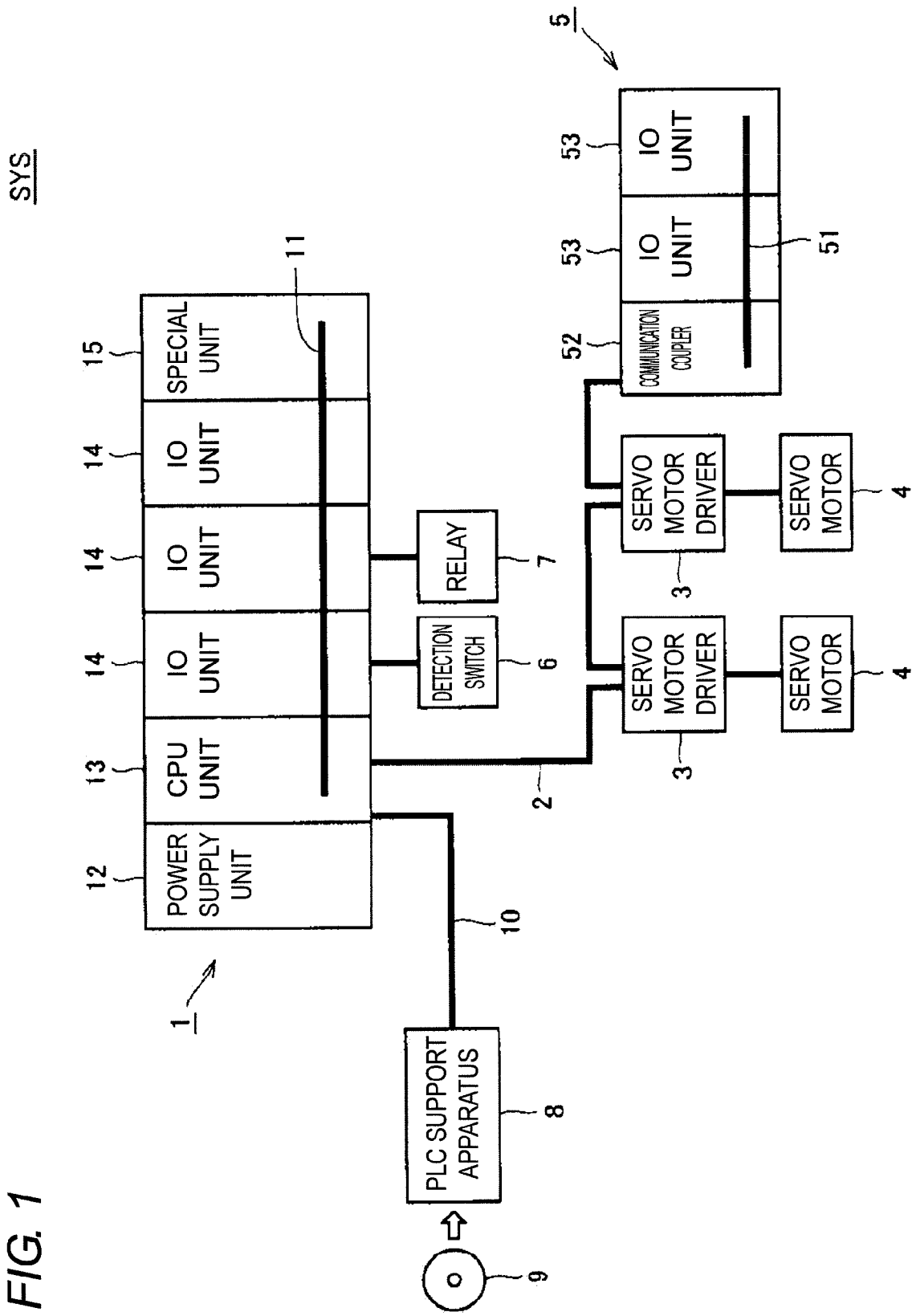
FIG. 1 is a schematic diagram showing a schematic configuration of a PLC system.

Hereinafter, embodiments of the present invention will be described with reference to the drawings.

First Embodiment

An embodiment of the present invention will be described in detail with reference to the drawings. Identical or corresponding units in the figures will be given the same reference numerals, and descriptions thereof will not be repeated.

<A. System Configuration>

A PLC (Programmable Logic Controller) according to the present embodiment has a motion control function for controlling a motion of a motor. First, referring to FIG. 1, a system configuration of a PLC 1 according to the present embodiment will be described.

FIG. 1 is a schematic diagram showing a schematic configuration of a PLC system according to the embodiment of the present invention. Referring to FIG. 1, a PLC system SYS includes the PLC 1, and servo motor drivers 3 and a remote IO terminal 5, which are connected to the PLC 1 through a field network 2, and a detection switch 6 and a relay 7 as field devices. Moreover, to the PLC 1 is connected a PLC support apparatus 8 through a connection cable 10 or the like.

The PLC 1 includes a CPU unit 13 that executes main arithmetic operation processing, one or more IO units 14, and a special unit 15. These units are configured so as to be capable of exchanging data through a PLC system bus 11. Moreover, power of a proper voltage is supplied by a power supply unit 12.

Details of the CPU unit 13 will be described with reference to FIG. 2 later.

Each of the IO units 14 is a unit involved in general input/output processing, and controls input/output of binarized data such as On/Off. In other words, the IO unit 14 collects information of whether a sensor such as the detection switch 6 is in a state where it is detecting some object (On), or in a state where it is not detecting any object (Off). Moreover, the IO unit 14 outputs either of a command to activate an output destination such as the relay 7 and an actuator (On) and a command to inactivate the same (Off).

The special unit 15 has functions that the IO units 14 do not support, such as input/output of analog data, temperature control, and communication by a specific communication method.

The field network 2 transmits various types of data exchanged with the CPU unit 13. As the field network 2, typically, various types of industrial Ethernet (registered trademark) can be used.

While in FIG. 1, the PLC system SYS having both the PLC system bus 11 and the field network 2 is illustrated, a system configuration in which only one of them is mounted can also be employed. For example, all the units may be connected by the field network 2. Alternatively, the servo motor drivers 3 may be directly connected to the PLC system bus 11 without using the field network 2. Furthermore, a communication unit of the field network 2 may be connected to the PLC system bus 11, so that the communication with a device connected to the field network 2 may be performed from the CPU unit 13 via the relevant communication unit.

The servo motor drivers 3 are each connected to the CPU unit 13 through the field network 2, and drive a servo motor 4 in accordance with command values form the CPU unit 13. More specifically, the servo motor driver 3 receives the command values such as a position command value, a velocity command value, and a torque command value from the PLC 1 with a predetermined period. Moreover, the servo motor driver 3 acquires actual measured values according to operation of the servo motor 4, such as a position, a velocity (typically, calculated from a difference between a current position and a last position), and a torque from a detector such as a position sensor (rotary encoder) and a torque sensor connected to a shaft of the servo motor 4. The servo motor driver 3 sets the command values from the CPU unit 13 as target values, and the actual measured values as feedback values to perform feedback control. That is, the servo motor driver 3 adjusts a current to drive the servo motor 4 so that the actual measured values become closer to the target values. The servo motor driver 3 may also be referred to as a servo motor amplifier.

While in FIG. 1, a system example in which the servo motors 4 and the servo motor drivers 3 are combined is shown, another configuration, for example, a system in which pulse motors and pulse motor drivers are combined can also be employed.

To the field network 2 of the PLC system SYS shown in FIG. 1 is further connected the remote IO terminal 5. The remote IO terminal 5 basically performs processing regarding general input/output processing as in the IO units 14. More specifically, the remote IO terminal 5 includes a communication coupler 52 that performs processing involving the data transmission in the field network 2, and one or more IO units 53. These units are configured so as to be capable of mutually exchanging data through a remote IO terminal bus 51.

<B. Hardware Configuration of CPU Unit>

Next, referring to FIG. 2, a hardware configuration of the CPU unit 13 will be described. FIG. 2 is a schematic diagram showing the hardware configuration of the CPU unit 13 according to the embodiment of the present invention.

Figure 2:
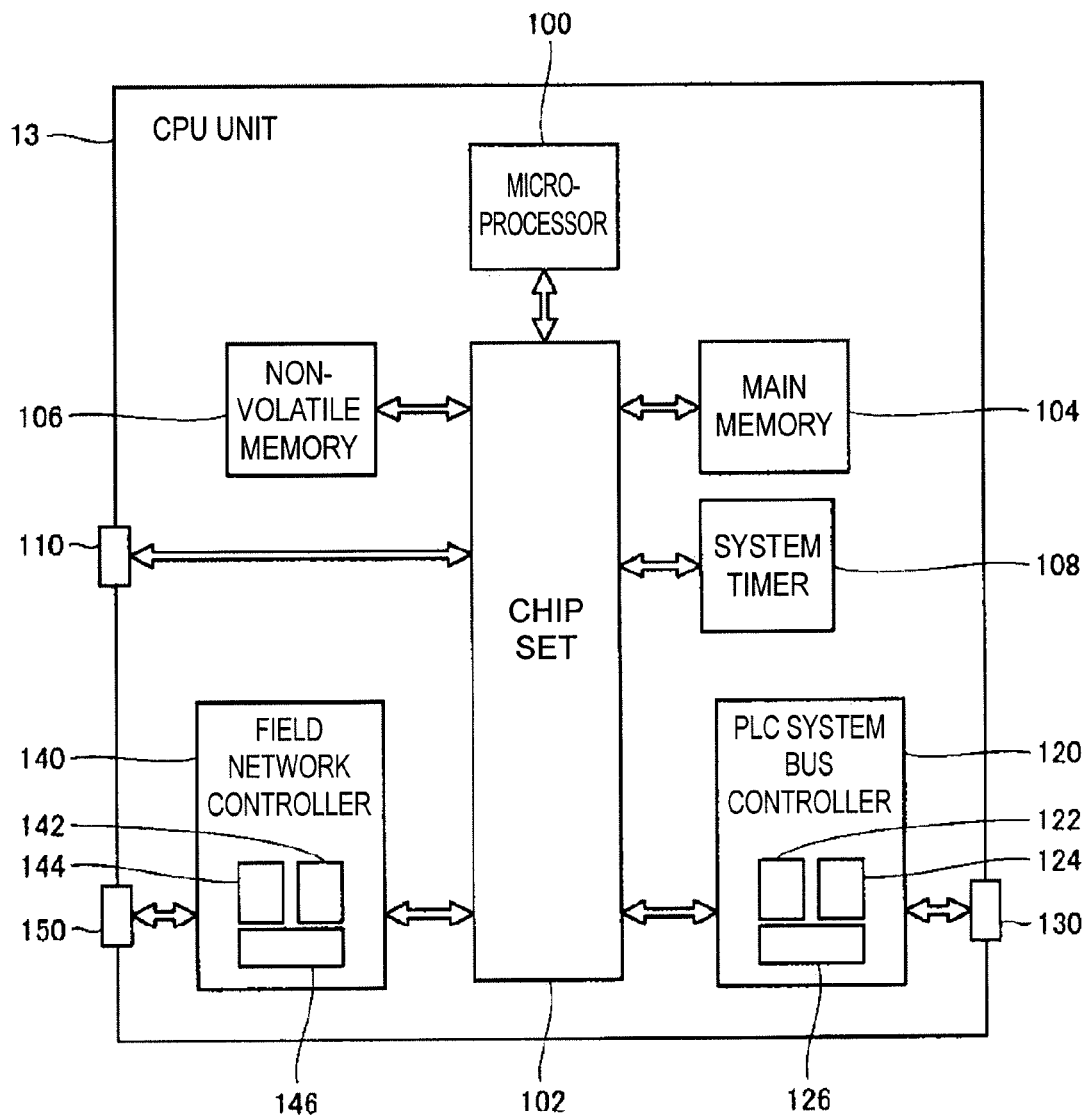
FIG. 2 is a schematic diagram showing a hardware configuration of a CPU unit.

Referring to FIG. 2, the CPU unit 13 includes a microprocessor 100, a chip set 102, a main memory 104, a non-volatile memory 106, a system timer 108, a PLC system bus controller 120, a field network controller 140, and a USB connector 110. The chip set 102 and the other components are joined through various buses.

The microprocessor 100 and the chip set 102 are typically configured in accordance with a general-purpose computer architecture. That is, the microprocessor 100 interprets and executes instruction codes sequentially supplied in accordance with an internal clock from the chip set 102. The chip set 102 exchanges internal data with the connected various components, and generates the instruction codes necessary for the microprocessor 100. Furthermore, the chip set 102 has a function of caching data resulting from execution of arithmetic operation processing in the microprocessor 100, and the like.

The CPU unit 13 has the main memory 104 and the non-volatile memory 106 as storage means.

The main memory 104 is a volatile storage area (RAM), and holds various programs to be executed in the microprocessor 100 after power-on of the CPU unit 13. Moreover, the main memory 104 is used as a working memory at the time of execution of the various programs by the microprocessor 100. As the above-described main memory 104, a device such as a DRAM (Dynamic Random Access Memory) and an SRAM (Static Random Access Memory) is used.

On the other hand, the non-volatile memory 106 holds data such as a real-time OS (Operating System), and a system program, a user program, a motion arithmetic operation program, system setting parameters of the PLC 1 in a non-volatile manner. These programs and data are copied to the main memory 104 so as to enable the microprocessor 100 to access them, as needed. As the non-volatile memory 106, a semiconductor memory such as a flash memory can be used. Alternatively, a magnetic recording medium such as a hard disk drive, an optical recording medium such as a DVD-RAM (Digital Versatile Disk Random Access Memory), and the like can also be used.

The system timer 108 generates an interrupt signal every predetermined period to provide to the microprocessor 100. Typically, while the interrupt signal is generated with a plurality of different periods depending on a specification of hardware, setting can also be made so as to generate the interrupt signal with an arbitrary period in accordance with the OS (Operating System), the BIOS (Basic Input Output System) and the like. The interrupt signal generated by this system timer 108 is utilized to implement control operation in each motion control cycle described later.

The CPU unit 13 has the PLC system bus controller 120 and the field network controller 140 as communication circuits.

The PLC system bus controller 120 controls the exchange of the data through the PLC system bus 11. More specifically, the PLC system bus controller 120 includes a DMA (Dynamic Memory Access) control circuit 122, a PLC system bus control circuit 124, and a buffer memory 126. The PLC system bus controller 120 is internally connected to the PLC system bus 11 through a PLC system bus connector 130.

The buffer memory 126 functions as a transmission buffer of data outputted to another unit through the PLC system bus 11 (hereinafter, also referred to as "output data"), and a reception buffer of data inputted from another unit through the PLC system bus 11 (hereinafter, also referred to as "input data"). The output data created by the arithmetic operation processing of the microprocessor 100 is primitively stored in the main memory 104. The output data to be forwarded to a specific unit is read from the main memory 104, and primarily held in the buffer memory 126. The input data forwarded from another unit, after being primarily held in the buffer memory 126, is transferred to the main memory 104.

The DMA control circuit 122 performs forwarding of the output data from the main memory 104 to the buffer memory 126, and forwarding of the input data from the buffer memory 126 to the main memory 104.

The PLC system bus control circuit 124 performs processing of transmitting the output data of the buffer memory 126 and processing of receiving the input data to store the same in the buffer memory 126 with respect to another unit connected to the PLC system bus 11. Typically, the PLC system bus control circuit 124 provides functions of a physical layer and a data link layer in the PLC system bus 11.

The field network controller 140 controls the exchange of the data through the field network 2. That is, the field network controller 140 controls the transmission of the output data and the reception of the input data in accordance with a standard of the used field network 2. In this manner, the CPU unit 13 according to the present embodiment is connected to each of the servo motor drivers 3 as a drive apparatus through the field network 2.

A DMA control circuit 142 performs forwarding of the output data from the main memory 104 to a buffer memory 146, and forwarding of the input data from the buffer memory 146 to the main memory 104.

The field network control circuit 144 performs processing of transmitting the output data of the buffer memory 146 and processing of receiving the input data to store the same in the buffer memory 146 with respect to another unit connected to the field network 2. Typically, the field network control circuit 144 provides functions of a physical layer and a data link layer in the field network 2.

The USB connector 110 is an interface to connect the PLC support apparatus 8 and the CPU unit 13. Typically, a program and the like that are forwarded from the PLC support apparatus 8 and can be executed in the microprocessor 100 of the CPU unit 13 are loaded on the PLC 1 through the USB connector 110.

<C. Software Configuration of CPU Unit>

Next, referring to FIG. 3, a software group to provide various functions according to the present embodiment will be described. The instruction codes included in the software are read at proper timing to be executed by the microprocessor 100 of the CPU unit 13.

Figure 3:
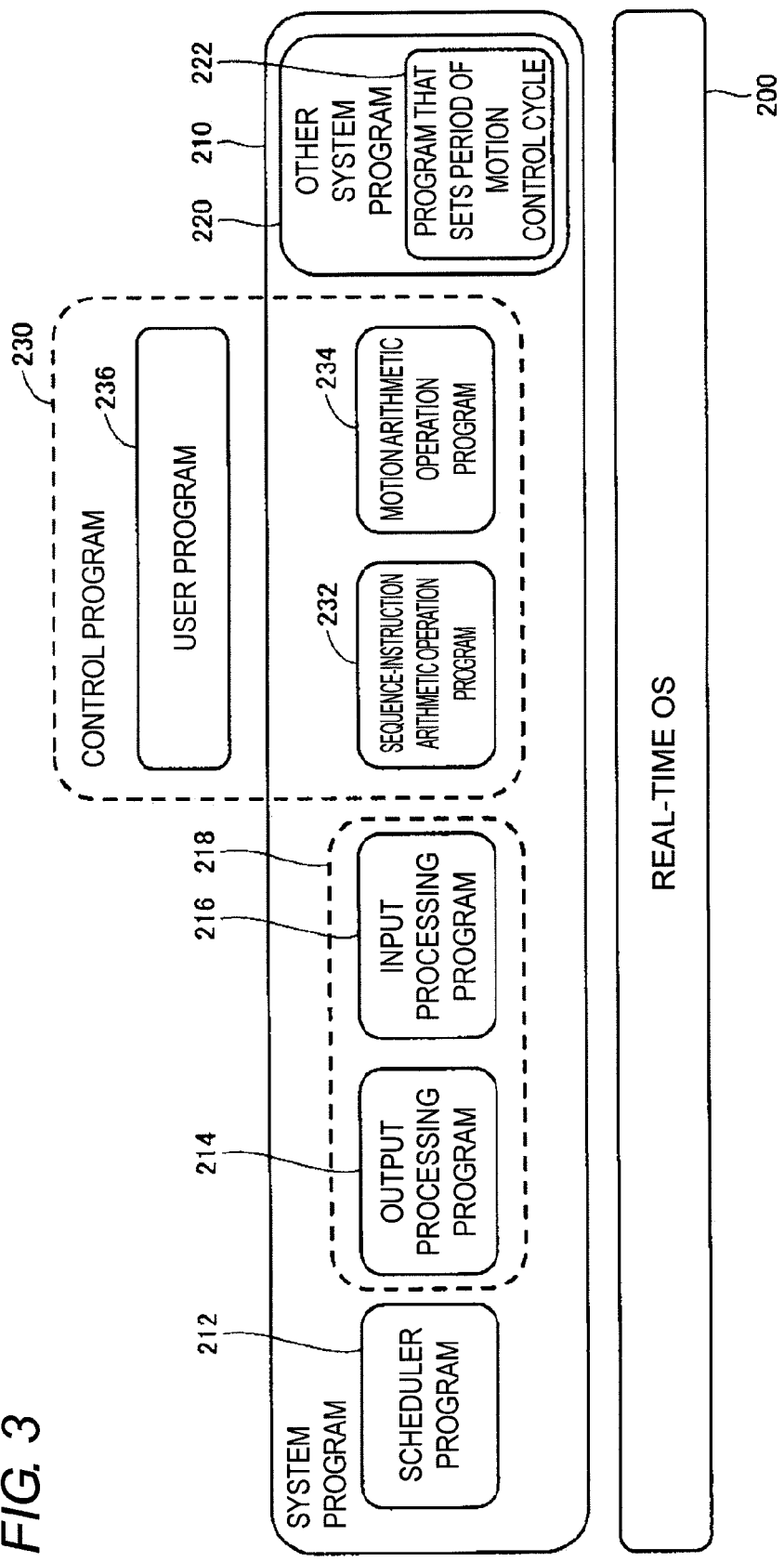
FIG. 3 is a schematic diagram showing a software configuration executed in the CPU unit.

FIG. 3 is a schematic diagram showing the software configuration executed in the CPU unit 13 according to the embodiment of the present invention. Referring to FIG. 3, as the software executed in the CPU unit 13, three hierarchies of a real-time OS 200, a system program 210, and a user program 236 are configured.

The real-time OS 200 is designed in accordance with a computer architecture of the CPU unit 13 to provide a basic execution environment for the microprocessor 100 to execute the system program 210 and the user program 236. This real-time OS is typically provided by a manufacturer of the PLC, a specialized software company or the like.

The system program 210 is a software group to provide a function as the PLC 1. Specifically, the system program 210 includes a scheduler program 212, an output processing program 214, an input processing program 216, a sequence-instruction arithmetic operation program 232, a motion arithmetic operation program 234, and another system program 220. Generally, since the output processing program 214 and the input processing program 216 are continuously (integrally) executed, these programs may be collectively referred to as an IO processing program 218.

The user program 236 is created in accordance with a control purpose in a user. That is, the user program 236 is a program arbitrarily designed in accordance with an object line (process) to be controlled using the PLC system SYS, or the like.

As will be described later, the user program 236 cooperates with the sequence-instruction arithmetic operation program 232 and the motion arithmetic operation program 234 to implement the control purpose in the user. That is, the user program 236 utilizes instructions, functions, functional modules and the like provided by the sequence-instruction arithmetic operation program 232 and the motion arithmetic operation program 234 to thereby implement programmed operation. Thus, the user program 236, the sequence-instruction arithmetic operation program 232, and the motion arithmetic operation program 234 may be collectively referred to as a control program 230.

In this manner, the microprocessor 100 of the CPU unit 13 executes the system program 210 and the user program 236 stored in the storage means.

Hereinafter, the respective programs will be described in more detail.

The user program 236 is created in accordance with the control purpose in the user (e.g., the object line or process) as described above. The user program 236 is typically in an object program format executable in the microprocessor 100 of the CPU unit 13. This user program 236 is generated in the PLC support apparatus 8 or the like by compiling a source program described in a ladder language or the like. The generated user program 236 in the object program format is forwarded from the PLC support apparatus 8 to the CPU unit 13 through the connection cable 10 to be stored in the non-volatile memory 106 or the like.

The scheduler program 212 controls processing start in each execution cycle and processing restart after processing interruption with respect to the output processing program 214, the input processing program 216 and the control program 230. More specifically, the scheduler program 212 controls the execution of the user program 236 and the motion arithmetic operation program 234.

The output processing program 214 rearranges the output data generated by the execution of the user program 236 (the control program 230) into a format appropriate for forwarding the same to the PLC system bus controller 120 and/or the field network controller 140. When the PLC system bus controller 120 or the field network controller 140 need a command to execute the transmission from the microprocessor 100, the output processing program 214 issues the command.

The input processing program 216 rearranges the input data received by the PLC system bus controller 120 and/or the field network controller 140 into a format appropriate for the use by the control program 230.

The sequence-instruction arithmetic operation program 232 is a program that is called when a certain type of sequence instruction to be used in the user program 236 is executed, and is executed to implement a content of the instruction.

The motion arithmetic operation program 234 is a program that is executed in accordance with a command by the user program 236 to calculate the command values outputted to the motor driver such as the servo motor driver 3 and the pulse motor driver.

The other system program 220 collectively indicates a program group to implement various functions of the PLC 1 other than the programs shown individually in FIG. 3. The other system program 220 includes a program 222 that sets a period of the motion control cycle. The period of the motion control cycle can be appropriately set in accordance with the control purpose. The program 222 that sets the period of the motion control cycle sets the system timer 108 so that the interrupt signal is generated with the period of the motion control cycle specified from the system timer 108. At the power-on of the CPU unit 13, the program 222 that sets the period of the motion control cycle is executed, by which information specifying the period of the motion control cycle is read from the non-volatile memory 106 and the system timer 108 is set in accordance with the read information.

The real-time OS 200 provides an environment to switch and execute the plurality of programs as time advances.

<D. Outline of Motion Control>

Next, a typical configuration included in the above-described user program 236 will be described. The user program 236 includes an instruction to cause whether or not a condition of the control start regarding the motion of the motor is established to be periodically determined. For example, it is logic in which whether or not a work to be subjected to some treatment by a driving force of the motor is conveyed up to a predetermined treatment position is determined. The user program 236 further includes an instruction to start the motion control in response to the determination of the establishment of this condition of the control start. With the start of this motion control, the execution of a motion instruction is instructed. Consequently, the motion arithmetic operation program 234 corresponding to the instructed motion instruction is activated to execute, first, initial processing necessary for calculating the command values to the motor every time the motion arithmetic operation program 234 is executed. Moreover, in the same motion control cycle as that of the initial processing, the command values in a first cycle are calculated. Accordingly, the initial processing and the first command value calculating processing are processing for the activated motion arithmetic operation program 234 to perform in the first execution. Hereinafter, the command values in each cycle are sequentially calculated.

<E. Outline of Synchronous Control>

Figure 4:
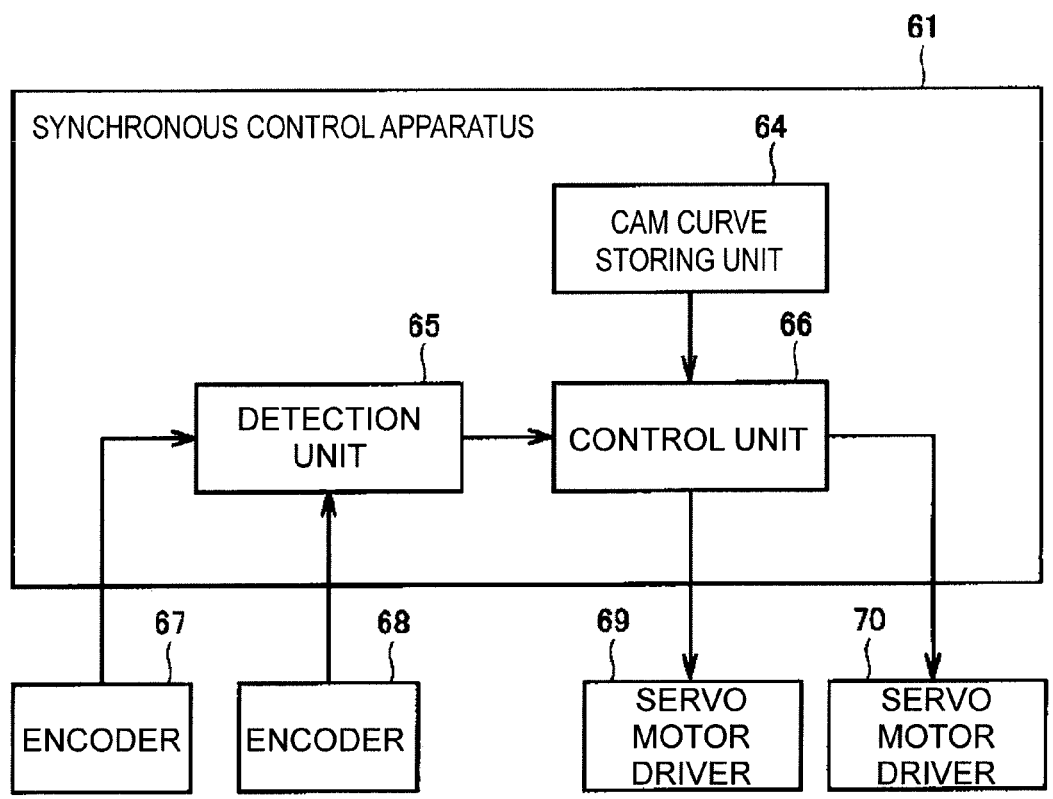
FIG. 4 is a diagram showing a configuration of a synchronous control apparatus.

FIG. 4 is a diagram showing a configuration of a synchronous control apparatus.

As shown in FIG. 4, a synchronous control apparatus 61 is an apparatus that executes the synchronous control of a main shaft and the driven shaft every control period, and includes a cam curve storing unit 64, a detection unit 65, and a control unit 66. These components are implemented by the control program 230, the program 222 that sets the period of the motion control cycle, and the scheduler program 212.

The detection unit 65 detects a current position of the main shaft, a current position of the driven shaft, a current velocity of the main shaft, and a current velocity of the driven shaft, based on count values of pulses from an encoder 67 for the main shaft and an encoder 68 for the driven shaft.

The cam curve storing unit 64 stores a first cam curve and a second cam curve.

In the present embodiment, the cam curve indicates a position of the driven shaft to displacement with time expressed by a rotation angle of the main shaft.

The control unit 66 calculates the position command value of the driven shaft, based on the first cam curve, the second cam curve and the current position of the driven shaft to output the same to a servo motor driver 70 for the driven shaft.

Specifically, before switch-over of the cam curves, the control unit finds the position command value as a position command value to a driven-side member, based on a value of the first cam curve and the current position of the driven shaft at each control timing. After the switch-over of the cam curves, the control unit finds the position command value, based on a value of the second cam curve and the current position of the driven shaft at each control timing. In a switch-over period of the cam curves, the control unit finds the position command value to the driven-side member, based on a value of a switch-over curve and the current position of the driven shaft. The value on the switch-over curve is a value obtained by subjecting first data based on the first cam curve or the position of the driven shaft and second data based on the second cam curve to weighted average.

In the weighted average, a weight of the first data is (1−a), and a weight of the second data is "a".

In the present embodiment, the weight "a" is 0 at start timing of the switch-over period, and monotonically increases as clock time advances in the switch-over period to reach 1 at end timing of the switch-over period.

Figure 5:
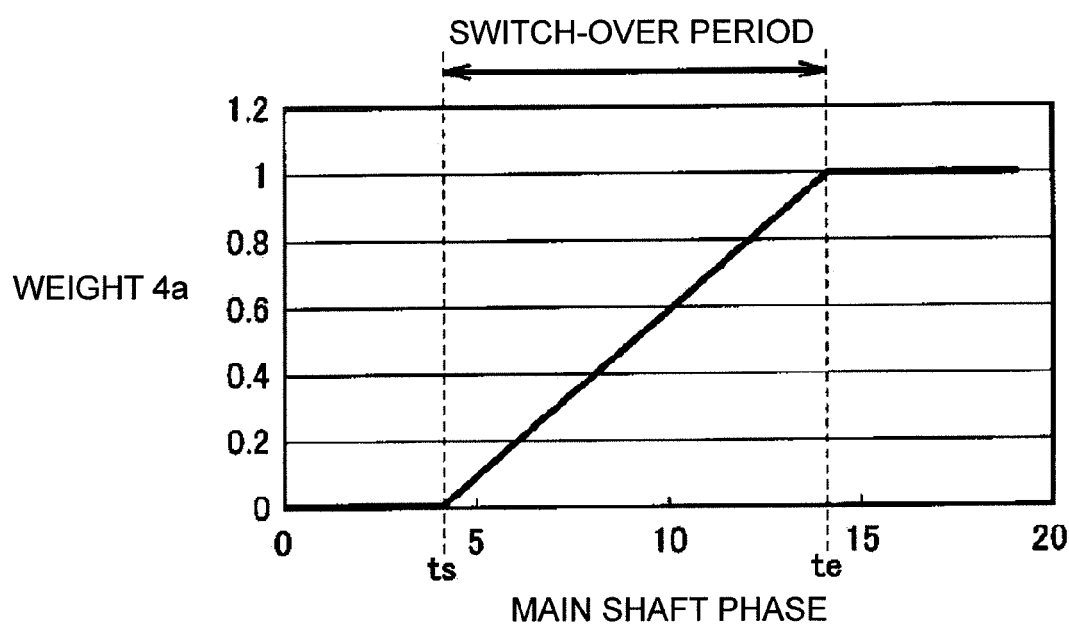
FIG. 5 is a diagram showing change in a weight "a"

In the present embodiment, more specifically, the weight "a" changes as a linear function with respect to the clock time passage, as shown in FIG. 5.

In the first embodiment, the first data is the value on the first cam curve at each control timing. The second data is the value on the second cam curve at each control timing.

Figure 6A:
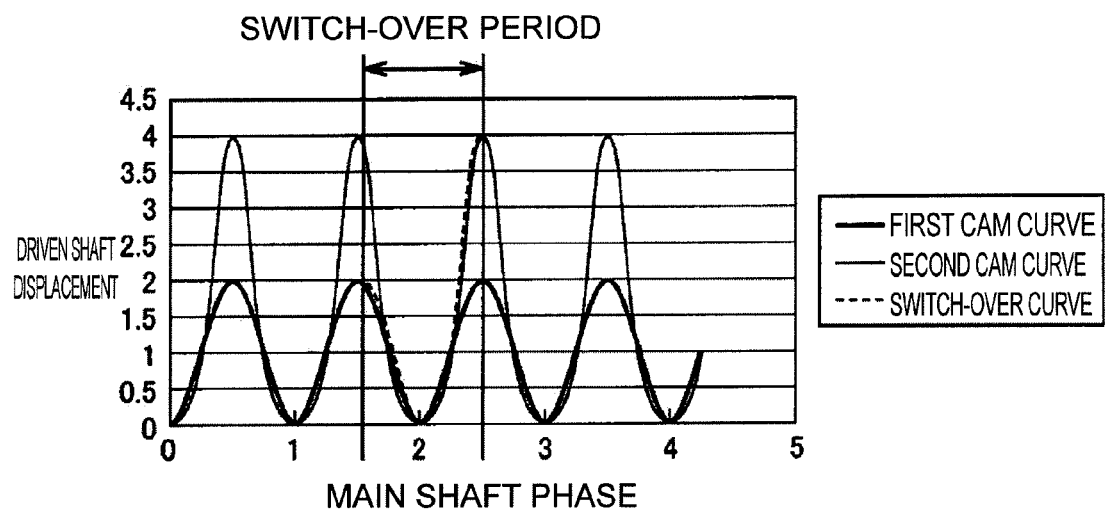
FIG. 6A is a diagram showing a first cam curve, a second cam curve and a switch-over curve in a first embodiment.

FIG. 6A is a diagram showing the first cam curve, the second cam curve and the switch-over curve in the first embodiment.

The value of the switch-over curve at each control timing is the value obtained by subjecting the value on the first cam curve at each control timing and the value on the second cam curve at each control timing to the weighted average, using the weight increasing from 0 to 1

Figure 6B:
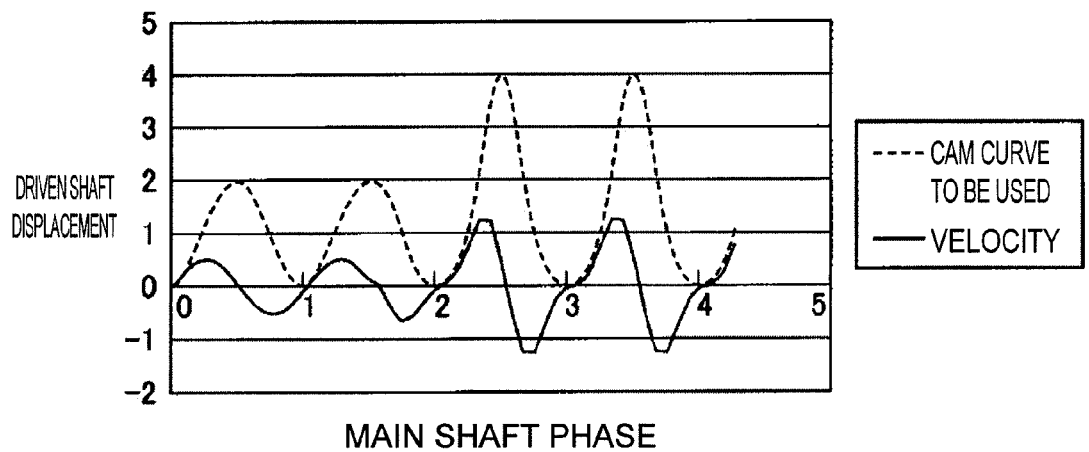
FIG. 6B is a diagram showing a cam curve to be used in a control unit 66 and a curve indicating a velocity, which is a curve resulting from differentiating the cam curve in the first embodiment.

FIG. 6B is a diagram showing a cam curve to be used in the control unit 66 and a curve indicating a velocity, which is a curve resulting from differentiating the cam curve in the first embodiment.

Before the switch-over of the cam curves, the first cam curve is used, in the switch-over period of the cam curves, the switch-over curve is used, and after the switch-over of the cam curves, the second cam curve is used.

As described above, according to the present embodiment, since in the switch-over period of the cam curves, the switch-over curve is found by the weighted average of the first cam curve and the second cam curve, the cam curves can be switched with ease and without delay.

Second Embodiment

In a second embodiment, the first data is the value on the first cam curve at the start timing of the switch-over period. The second data is the value on the second cam curve at each control timing as in the first embodiment.

In the present embodiment, the weight "a" changes as a linear function with respect to the clock time passage, as shown in FIG. 5 as in the first embodiment.

Figure 7A:
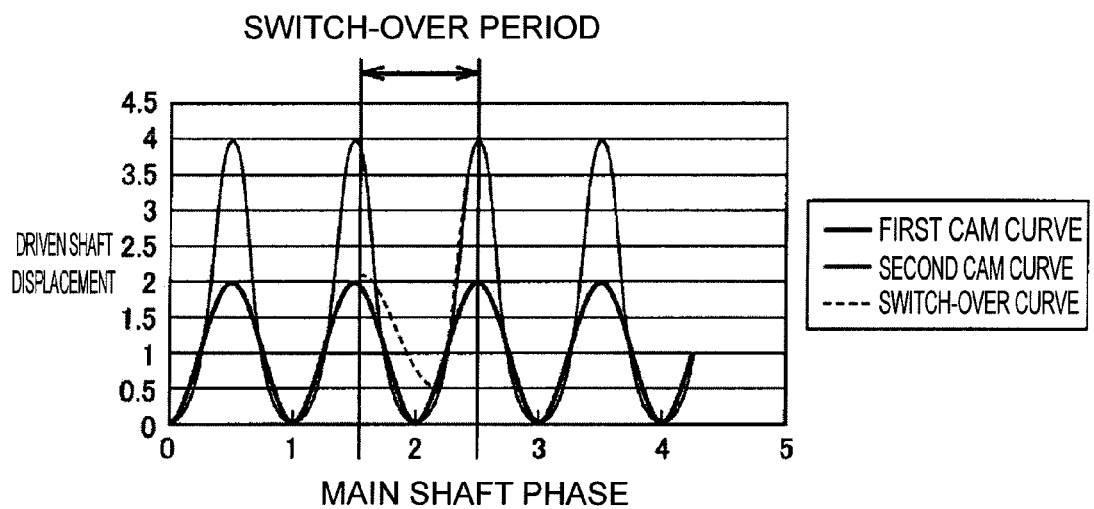
FIG. 7A is a diagram showing the first cam curve, the second cam curve and the switch-over curve in a second embodiment.

FIG. 7A is a diagram showing the first cam curve, the second cam curve and the switch-over curve in the second embodiment.

The value of the switch-over curve at each control timing is the value obtained by subjecting the value on the first cam curve at the start timing of the switch-over period and the value on the second cam curve at each control timing to the weighted average, using the weight increasing from 0 to 1.

Figure 7B:
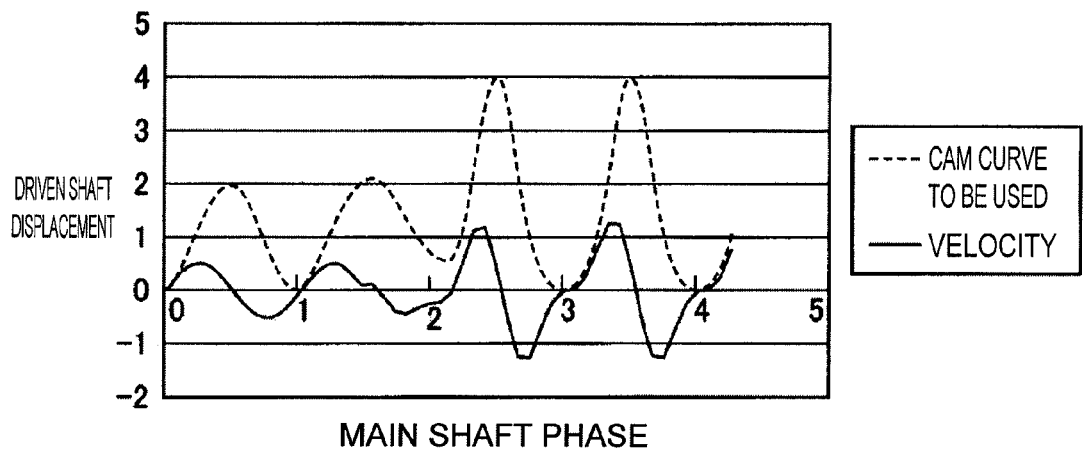
FIG. 7B is a diagram showing the cam curve to be used in the control unit 66 and the curve indicating the velocity, which is the curve resulting from differentiating the cam curve in the second embodiment.

FIG. 7B is a diagram showing the cam curve to be used in the control unit 66 and the curve indicating the velocity, which is the curve resulting from differentiating the cam curve in the second embodiment.

Before the switch-over of the cam curves, the first cam curve is used, in the switch-over period of the cam curves, the switch-over curve is used, and after the switch-over of the cam curves, the second cam curve is used.

As described above, according to the present embodiment, since in the switch-over period of the cam curves, the switch-over curve is found by the weighted average of the value of the first cam curve at the start timing of the switch-over period and the second cam curve, the cam curves can be switched with ease and without delay.

[Modification 1 of Second Embodiment]

In the present modification, the first data is the value on the first cam curve at each control timing as in the first embodiment. The second data is the value on the second cam curve at end timing of the switch-over period.

As described above, according to the present embodiment, since in the switch-over period of the cam curves, the switch-over curve is found by the weighted average of the first cam curve and the value on the second cam curve at the end timing of the switch-over period, the cam curves can be switched with ease and without delay.

Third Embodiment

In a third embodiment, the first data is the position of the driven shaft at each control timing. For the position of the driven shaft, the value that the detection unit 65 calculates, based on the count value of the pulses from the encoder 68 for the driven shaft is used.

The second data is the value on the second cam curve at each control timing as in the first embodiment.

Figure 8A:
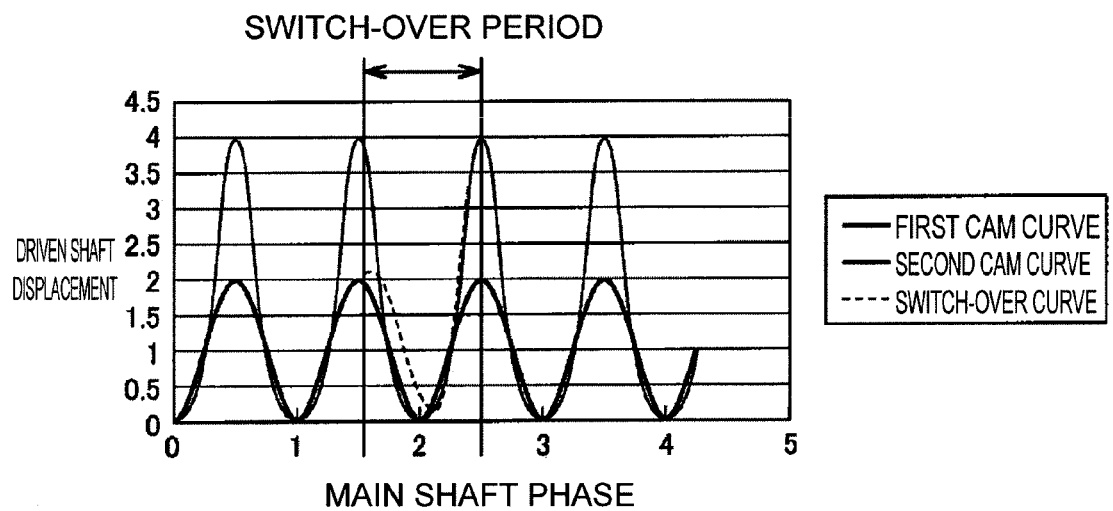
FIG. 8A is a diagram showing the first cam curve, the second cam curve and the switch-over curve in a third embodiment.

FIG. 8A is a diagram showing the first cam curve, the second cam curve and the switch-over curve in the third embodiment.

The value of the switch-over curve at each control timing is the value obtained by subjecting the position of the driven shaft at each control timing and the value on the second cam curve at each control timing to the weighted average, using the weight increasing from 0 to 1.

Figure 8B:
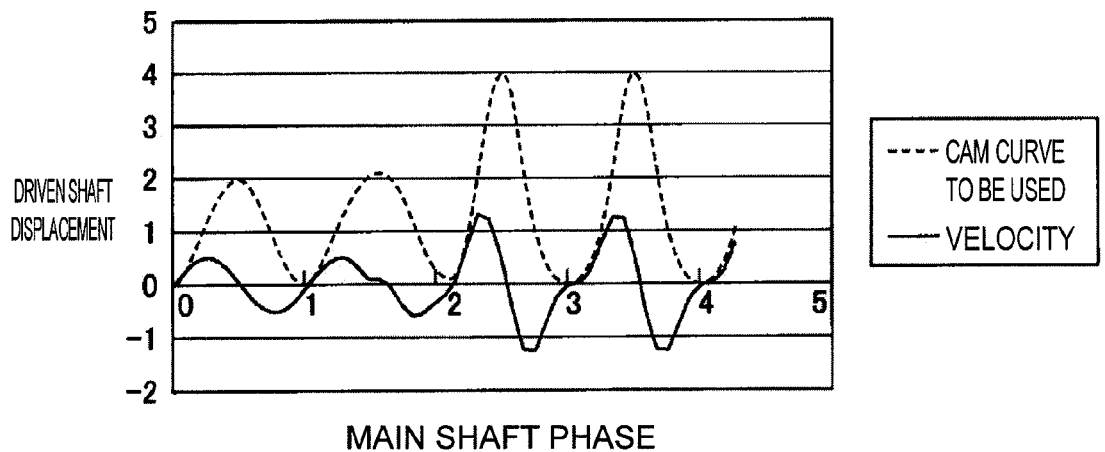
FIG. 8B is a diagram showing the cam curve to be used in the control unit 66 and the curve indicating the velocity, which is the curve resulting from differentiating the cam curve in the third embodiment.

FIG. 8B is a diagram showing the cam curve to be used in the control unit 66 and the curve indicating the velocity, which is the curve resulting from differentiating the cam curve in the third embodiment.

Before the switch-over of the cam curves, the first cam curve is used, in the switch-over period of the cam curves, the switch-over curve is used, and after the switch-over of the cam curves, the second cam curve is used.

As described above, according to the present embodiment, since in the switch-over period of the cam curves, the switch-over curve is found by the weighted average of the current position of the driven shaft and the second cam curve, the cam curves can be switched with ease and without delay.

[Modification 1 of Third Embodiment]

In the present modification, the first data is the position of the driven shaft at the start timing of the switch-over period. The second data is the value on the second cam curve at each control timing as in the first embodiment.

As described above, according to the present embodiment, since in the switch-over period of the cam curves, the switch-over curve is found by the weighted average of the position of the driven shaft at the start timing of the switch-over period and the second cam curve, the cam curves can be switched with ease and without delay.

The present invention is not limited to the above embodiments, but for example, includes the following modifications as well.

[Modification 1]

The weight "a" may change as an n-th order function with respect to clock time. "n" is a positive real number. When "n" is 1, the weight "a" is a function that changes as a straight line as in the first embodiment. When "n" is not 1, the weight "a" is a function that changes as a curve.

For example, when $\theta$ associated with clock time is a phase of the main shaft, $a(\theta)=(\theta/2\pi)^{0.5}$ can be established. When the start timing of the switch-over period is set to $\theta=0$, and the end timing of the switch-over period is set to $\theta=2\pi$, $a(0)=0$, $a(2\pi)=1$ are established.

[Modification 2]

The weight "a" may change as a sine function with respect to clock time. For example, when $\theta$ is the phase of the main shaft, $a(\theta)=\sin(\theta/4)$ can be established. When the start timing of the switch-over period is set to θ=0, and the end timing of the switch-over period is set to θ=2π, a(0)=0, a(2π)=1 are established.

[Modification 3]

The weight "a" may change as a cosine function with respect to clock time. For example, when θ is the phase of the main shaft, a(θ)=cos(θ/4−π/2) can be established. When the start timing of the switch-over period is set to θ=0, and the end timing of the switch-over period is set to θ=2π, a(0)=0, a(2π)=1 are established.

The embodiments disclosed here should be considered to be illustrative in all the points, and not limitative. It is intended that the scope of the present invention is indicated not by the above description but by the scope of claims, and all modifications within meanings and the scope equivalent to the scope of claims are included.

What is claimed is:

1. A synchronous control apparatus that executes synchronous control of a main shaft and a driven shaft in each control period, comprising:
    a storage that stores a representation of a first cam curve and a representation of a second cam curve; and
    a controller that calculates a position command value of the driven shaft to control the driven shaft with the calculated position command value,
    wherein before switch-over of the cam curves, the controller finds the position command value to a driven-side member, based on a value on the first cam curve at each control timing,
    after the switch-over of the cam curves, the controller finds the position command value, based on a value on the second cam curve at each control timing, and
    in a switch-over period of the cam curves, the controller finds the position command value to the driven-side member based on a value obtained by utilizing first data based on one of the first cam curve and a position of the driven shaft and second data based on the second cam curve to provide a weighted average at each control timing,
    wherein in the weighted average, a weight is variable in conjunction with a main shaft position, and at start timing of the switch-over period, a weight of the first data is set larger than a weight of the second data, and at end timing of the switch-over period, the weight of the first data is set smaller than the weight of the second data.

2. The synchronous control apparatus according to claim 1, wherein the first data is the value on the first cam curve at each control timing.

3. The synchronous control apparatus according to claim 1, wherein the first data is the value on the first cam curve at start timing of the switch-over period.

4. The synchronous control apparatus according to claim 1, wherein the first data is the position of the driven shaft at each control timing.

5. The synchronous control apparatus according to claim 1, wherein the first data is the position of the driven shaft at start timing of the switch-over period.

6. The synchronous control apparatus according to claim 1, wherein the second data is the value on the second cam curve at each control timing.

7. The synchronous control apparatus according to claim 1, wherein the second data is the value on the second cam curve at end timing of the switch-over period.

8. The synchronous control apparatus according to claim 1, wherein when in the weighted average, a weight of the first data is (1−a), and a weight of the second data is "a",
    the weight "a" is 0 at start timing of the switch-over period, and monotonically increases as a time period advances in the switch-over period to reach 1 at end timing of the switch-over period.

9. The synchronous control apparatus according to claim 8, wherein the weight "a" changes as a linear function with respect to the time period.

10. The synchronous control apparatus according to claim 8, wherein the weight "a" changes as an n-th order function with respect to the time period, where "n" is a positive real number other than 1.

11. The synchronous control apparatus according to claim 8, wherein the weight "a" changes as a sine function with respect to the time period.

12. The synchronous control apparatus according to claim 8, wherein the weight "a" changes as a cosine function with respect to the time period.

* * * * *